United States Patent [19]
Lee

[11] Patent Number: 5,915,663
[45] Date of Patent: Jun. 29, 1999

[54] OBJECT PROTECTION SYSTEM FROM COLLISION, VIBRATION AND EARTHQUAKE

[76] Inventor: Ken-Chee Lee, 1939 Greentree Rd., Cherry Hill, N.J. 08003

[21] Appl. No.: 08/033,979

[22] Filed: Mar. 19, 1993

Related U.S. Application Data

[63] Continuation-in-part of application No. 07/750,216, Aug. 19, 1991, abandoned, which is a continuation-in-part of application No. 07/201,956, Jun. 2, 1988, abandoned.

[51] Int. Cl.$^6$ .................................................... F16M 13/00
[52] U.S. Cl. ............................................................ 248/568
[58] Field of Search .............................. 182/137; 248/568

[56] References Cited

U.S. PATENT DOCUMENTS

3,167,312  1/1965  Blanchard ................................ 182/137

*Primary Examiner*—Alvin C. Chin-Shue

[57] ABSTRACT

An object protection system protects properties and lives from collision, vibration or earthquake. The system comprises an energy body, a forcing system, and energy force releasing means. According to the theory of the present invention, the reacting force responding to the forcing system in the direction opposite to the striking force is significantly less than the striking force by the principle of energy force released from the forcing system into a space. This novel concept of the present invention is leaping from the classical science with much significance and many distinctive applications to protect the properties and lives. Further application of this principle in consecutively and continuously to reduce the reacting force from the forcing system, theoretically, the reacting force may approach zero, practically, the reacting force cannot reach zero. In practical applications, the present invention achieves a degree of significance by further reducing the reacting force to an amount less than fifty (50) percent of the striking force to protect the properties and lives in case of collision, vibration or earthquake. The system further comprises and combines means for inflating and refilling medium into cell structure, moveable panel and fixed panel, a number of cell structures in cell structure, a number of cell structures in series, parallel, or loop arrangements, means for decelerating and balancing a moving object, and means for measuring the reacting force. The system can be disposed onto land, air and water vehicles, building structures, building grounds, river banks, river beds, piers, highway barriers, airport runways, car raceways, train railways, guided rails, rail end stops, nuclear reactor blow out stops, vibrating machines, sensitive equipment, instruments, dangerous goods, and supporting structures for the protection of properties and lives to enhance our quality of life and preserve a safe living environment.

1 Claim, 9 Drawing Sheets

OBJECT PROTECTION SYSTEM FROM COLLISION, VIBRATION AND EARTHQUAKE

This application is a continuation-in-part, of application Ser. No. 07/750,216 filed Aug. 19, 1991, now abandoned. Which is a continuation-in-part of application Ser. No. 07/201,956, filed Jun. 2, 1988, now abandoned.

BACKGROUND OF INVENTION

1. Field of Invention

The present invention relates to the protection for Properties and lives by reducing the reacting force from collision, vibration or earthquake. The present invention provides significant protection for objects such as vehicles, passengers, building structures, occupants, highways, bridges, vibrating machines, sensitive equipment and instruments, and dangerous goods while a collision, vibration or earthquake occurs.

The conception of the invention originated when the applicant frequently took a ferry across the Hong Kong Harbor during his childhood. As the ferry attempted to dock at a pier, there was such a tremendous reacting force from the pier responding to the ferry that he and other passengers could hardly stand on board of the ferry. He questioned, "Can this reacting force be reduced or eliminated?" The question has had no answer for many years. Later, he learned Newton's Third Law of Motion: For every action there is an equal and opposite reaction. This law is applicable to the equal action and reaction of the ferry and pier. He also observed the motions of fire crackers in the air, seismic damages to structural members, and flattening tires of running automobiles. The foregoing mentioned physical changes of the motions or configurations of the objects are the results of energy release and transformation from the particular forcing systems.

2. Description of the Prior Art

Inflatable fluid cushions and air bags have been invented to provide impact cushioning and absorbing for passengers in vehicles. They are sensitive to the impact of the vehicles. The passengers are restrained by the cushions or air bags. See, for examples, U.S. Pat. Nos. 2,781,203; 3,514,124; 3,514,125; 3,927,901; 3,964,255 and 4,565,535.

Impact bumpers have been invented for vehicles to absorb impact upon bumping against other objects. See, samples of U.S. Pat. Nos. 3,655,231 and 3,960,397.

Earthquake protection apparatuses of isolation, suspension and spring connection have been invented to protect equipment and structures. They are the means of energy absorbing or force sliding due to vibration or earthquake. See U.S. Pat. Nos. 4,330,103; 4,351,515 and 4,644,714.

A vibration damper has been invented for damping vibration from all directions. The application of this invention is limited to a constant force with a square wave pattern. See U.S. Pat. No. 3,145,012.

Isolating platforms have been invented for absorbing or cushioning as a shock or impact resistant. See U.S. Pat. Nos. 3,351,027 and 3,679,159.

A leveling foundation has been invented to maintain a structural floor in a substantially level condition. See U.S. Pat. No. 4,191,496.

An earthquake isolation floor has been invented for protecting against vibration by means of low friction elements and stressed springs. See U.S. Pat. No. 4,371,143.

A base plate on elastic support has been invented as a vibration damper with adjustable support condition. See U.S. Pat. No. 4,489,991.

A shock absorbing platform has been invented for absorbing vibration from equipment and adjusting vibration damping. See U.S.S.R. Pat. No. 585,255.

An improved trampoline type bouncer toy has been invented. It is a toy for entertainment. See U. S. Pat. No. 3,167,312.

A cushioning device for protection of passengers in a traveling vehicle has been invented. It comprises an inflatable cushioning bag, an unfoldable inflating bag, an impact sensing means and air passing holes or valves. See U.S. Pat. No. 3,843,150.

None of the above cited prior art references apply the same theory and principle as the present invention. The theory of the present invention states that the reacting force is less than the striking force by the principle of the energy force releasing from a forcing system into a space. Therefore, the objects are protected by the system.

SUMMARY OF THE INVENTION

The present invention is an object protection system. The system reduces the reacting force by the principle of the energy force released from a forcing system into a space. Further application of this principle in consecutively and continuously to reduce the reacting force from a forcing system, theoretically, the reacting force may approach zero, practically, the reacting force cannot reach zero. In practical application, the present invention achieves a degree of significance by further reducing the reacting force to an amount less than fifty (50) percent of the striking force to protect the properties and lives in case of collision, vibration or earthquake.

The object protection system comprises at least one cell structure, medium and force releasing means, wherein the system receiving said striking force acts on said cell structure containing said medium thereby forms a forcing system and creates an energy force, said energy force releases from said forcing system into a space by said energy force releasing means disposed in the cell structure. Said reacting force responding to the forcing system in the direction opposite to the striking force is significantly less than the striking force.

The system further comprises and combines at least a means for inflating the cell structure with the medium, a means for refilling medium into the cell structure, a moveable panel, a fixed panel, a number of cells in cell structure, a number of cell structures in series, parallel or loop arrangements, a means for decelerating and balancing a moving object, and means for measuring and recording the reacting force responding to the forcing system in the direction opposite to the striking force.

The applications of the novel concept of the present invention have numerous advantages to protect objects. Particularly, an existing building structure with no prior seismic design can be protected in case of earthquake by using a building ground method of the present invention. The properties and lives protection can be achieved without restraining the passengers of vehicles or the occupants of buildings. The spaces and the accommodations of the elements and structures of the object protection system can be disposed outside and or inside of the objects.

The system can be disposed onto land, air and water vehicles, building structures, building grounds, river banks, river beds, piers, highway barriers, airport runways, car raceways, train railways, guided rails, rail end stops, nuclear reactor blow out stops, vibrating machines, sensitive equipments, instruments, dangerous goods, and supporting structures for the protection of properties and lives.

VERIFICATION

Tests of the object protection system of the present invention have been conducted. The test results coincide with the theory, principle and function of the invention. A significant amount of energy force, in each test, has been released from the forcing system into a space.

The theory states that a reacting force is less than a striking force by the principle of an energy force released from a forcing system into a space. The reacting force responding to a forcing system in the direction opposite to a striking force is significantly less than the striking force.

The general equation is written in Equation I.

$$RF = SF - S_n (EF) - S_n (SM) \quad \text{Equation I}$$

where RF=reacting force
  SF=striking force
  EF=energy force
  SM=system and material dampings
  S=the sum of all terms from 1 to n
  n=number of times the energy forces released from the forcing systems into a space
note: The system and material dampings, SM will absorb and dissipate a small amount of energy from the forcing system, but it is very little and insignificant with respect to the energy released from the forcing system into a space.
if, n=>, RF=>0

This theory describes the effects and the relationship among the striking force, energy body, reacting force, transformation of force and energy in a particular forcing system. The reacting force responding to the energy body in the direction opposite to the striking force is less than the striking force by the principle of the energy force released from the forcing system into a space. This novel concept of the present invention is leaping from the classical science with much significance and many distinctive applications to protect the properties and lives.

DRAWING REFERENCE NUMERALS 1 object
2 striking force
3 reacting force
4 reacting force record pin
5 medium
6 medium cell structure
7 medium inflating means
8 medium refilling means
9 moveable panel sliding means
10 force releasing means
11 force measuring means
12 moveable panel
13 fixed panel
14 deceleration and balancing means
15 spring or elastic materials
16 supporting member, frame, foundation or the like
17 attaching means

DESCRIPTION OF THE PREFERRED EMBODIMENTS

Figure 1:
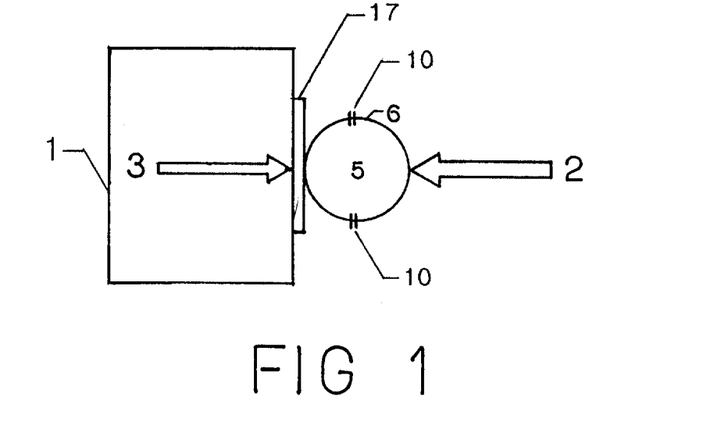
FIG. 1 is the plan view of a schematic presentation of the principle, function and construction of the object protection system performing in a working model which is not limited to the application, extension, improvement and refinement of the present invention.

Referring to FIG. 1 of the drawings, herein is shown a preferred embodiment of the object protection system of the present invention by means of the schematic working model. It comprises a cell structure 6 attaching to an object 1, containing medium 5 and disposing at least one force releasing means 10. A striking force 2 acts on a cell structure 6 creates an energy force in the medium 5 and forms a forcing system. Then the energy force is released by the force releasing means 10. The reacting force 3 responding to the forcing system in the direction opposite to the striking force 2 is significantly less than the striking force 2, by the principle of the energy force released from the forcing system into a space. Therefore, the object is protected by this object protection system.

Figure 2:
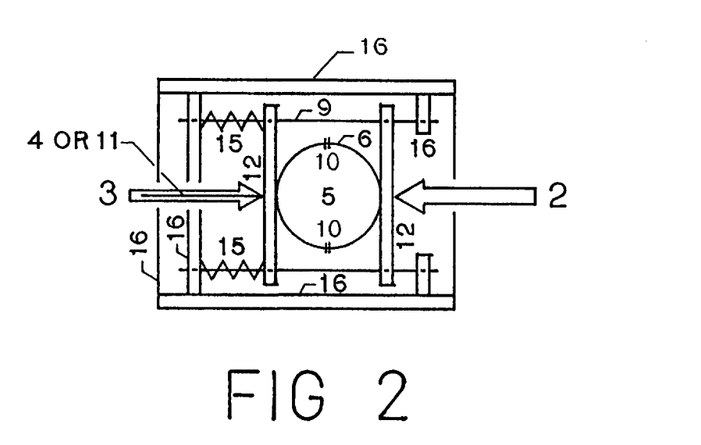
FIGS. 2 and 3 are the plan views of a schematic presentation of the principle, function and construction of the object protection system performing in the testing models which are not limited to the application, extension, improvement and refinement of the present invention.

Referring to FIG. 2 of the drawings, herein is shown a preferred embodiment of the object protection system of the present invention by means of a schematic testing model. It comprises a cell structure 6 containing medium 5 and disposing at least one force releasing means 10. Said cell structure 6 is located between a first and a second moveable panels 12 can move on a set of panel sliding means 9 spanning on a frame 16. The second moveable panel is supported by a set of springs or elastic materials 15 attached to said frame 16. A reacting force record pin 4 or a force measuring means 11 is attached to the second moveable panel 12. A striking force 2 acts on a first moveable panel 12 through a cell structure 6 into a medium 5 wherein, creates an energy force and forms a forcing system. Then the energy force is released by said force releasing means 10. The reacting force 3 responding to the forcing system in the direction opposite to the striking force 2 indicated on a reacting force record pin 4 or a force measuring means 11 is significantly less than the striking force 2, by the principle of the energy force released from the forcing system into a space.

Figure 3:
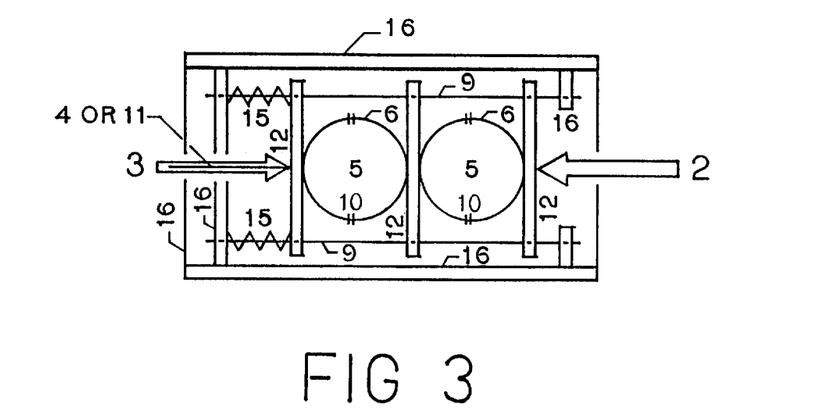

Referring to FIG. 3 of the drawings, herein is shown a preferred embodiment of the object protection system of the present invention by means of a schematic testing model. It comprises two cell structures 6 containing medium 5 and disposing the force releasing means 10. Said two ecell structures 6 are located among a first, second and third moveable panels 12, Said panels can move on a set of panel sliding means 9 spanning on a frame 16. Said third moveable panel is supported by a set of springs or elastic materials 15 attached to said frame 16. A reacting force record pin 4 or a force measuring means 11 is attached to the third moveable panel 12. A striking force 2 acts on a first moveable panel 12 through the first cell structure 6 into the first medium 5. Said striking force continuously acts onto the second moveable panel 12 through the second cell structure 6 into the second medium 5 wherein, creates energy forces in the first and second medium 5 and forms a forcing system. Then the energy forces are released from said forcing system through said force releasing means 10 into a space. The reacting force 3 responding to the forcing system in the direction opposite to the striking force 2 indicated on a reacting force record pin 4 or a force measuring means 11 is significantly less than the striking force 2, by the principle of the energy force released from the forcing system into a space.

Figures 4, 5:
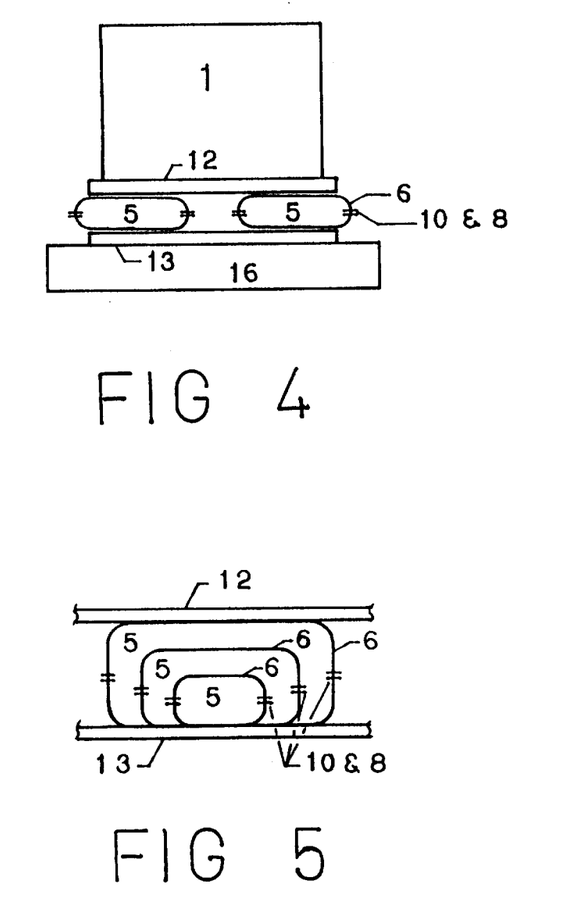
FIG. 4 is the elevation of a machine, equipment or instrument supported by the object protection system.
FIGS. 5 and 15 are the multiple cell structures in cell structure of the object protection system.

FIG. 4 shows another preferred embodiment of the present invention which is applying the same principle of the object protection system. It comprises an object 1 of vibrating machine, equipment or instrument. A striking force 2 acts onto a moveable panel 12, through the cell structures 6 into mediums 5. Said cell structures are disposed on a fixed panel 13 and supported by a foundation 16. The force releasing means 10 in function on one cell structure 6, and the medium refilling means 8 in function on the other cell structure 6 at the same time. Thus, the functions of the force releasing and the medium refilling are continuously taking place at both sides under the object 1 during the occurrence of the forcing system. According to the principle of the object protection system, the reacting force responding to said forcing system is much less than the vibrating force. Therefore, the object is protected by the object protection system.

Figure 15:
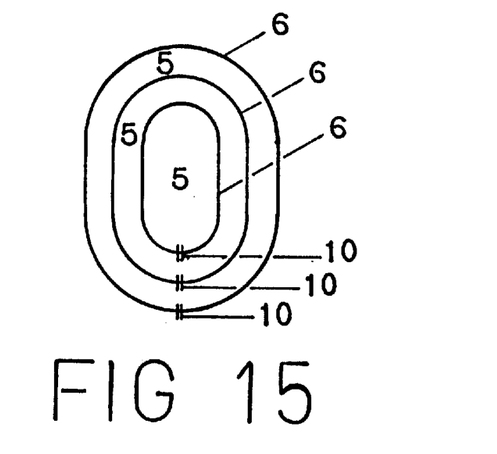

FIGS. 5 and 15 show the arrangements of the cell structures 6 within cell structure 6. These arrangements comprise multiple cell structures 6 and medium 5, force releasing means 10 and medium refilling means 8. According to the same principle and function of the object protection system, the energy forces are consecutively released from the forcing system into a space. Therefore, the amount of reacting force will be further reduced.

Figure 6:
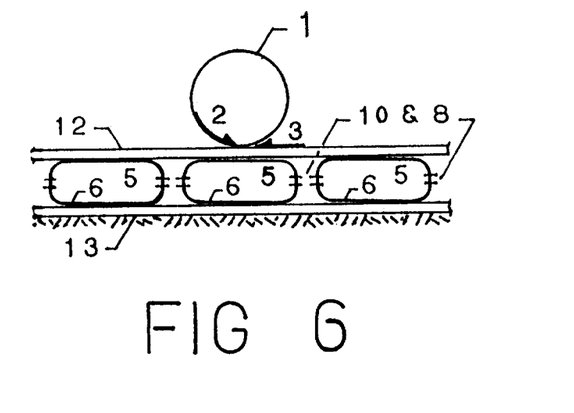
FIG. 6 is the object protection system applying to airport runways, car raceways, vehicle tracks and guided rails.
Figure 14:
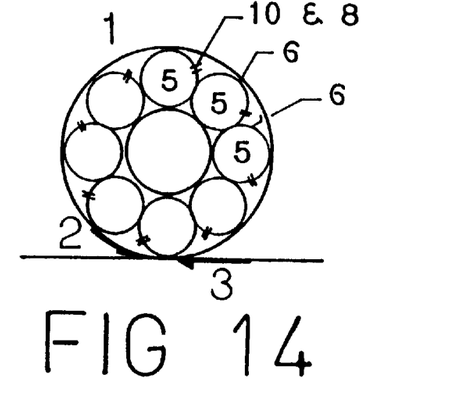
FIG. 14 is a side elevation of the wheels of an airplane or other vehicles disposed with a number of cell structures in a loop arrangement of the object protection system.

FIGS. 6 and 14 show an embodiment which applies the same principle of the object protection system. They comprise a number of cell structures 6 and mediums 5 in a series or a loop arrangement, with force releasing means 10, medium refilling means 8, and the object 1 of a revolving wheel. According o the same principle of the object protection system, the reacting force 3 responding to the revolving wheel striking force 2 will be continuously reduced.

Figure 7:
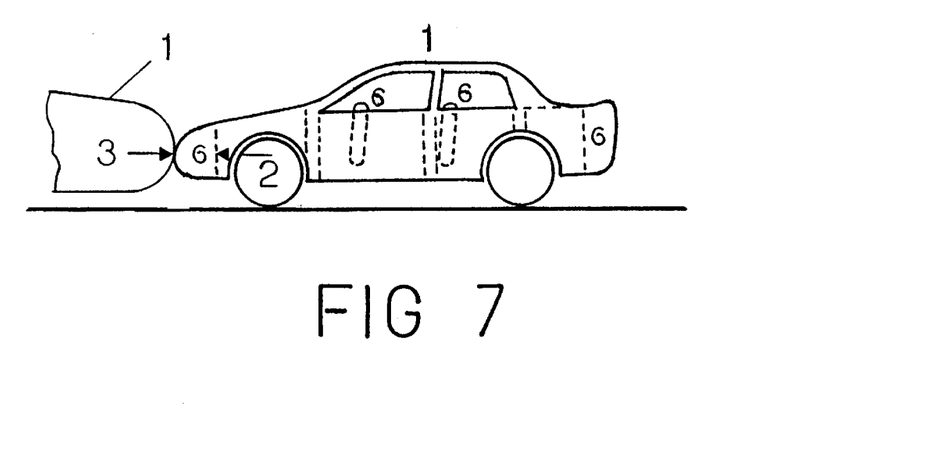
FIGS. 7 and 8 are a side elevation and a plan view of a car, respectively disposed the built-in object protection system.
Figure 8:
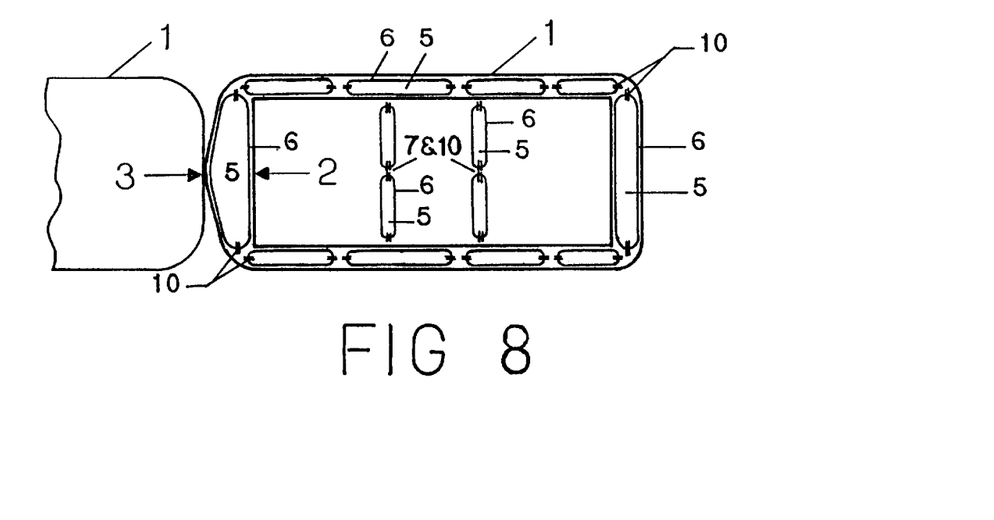
Figure 9:
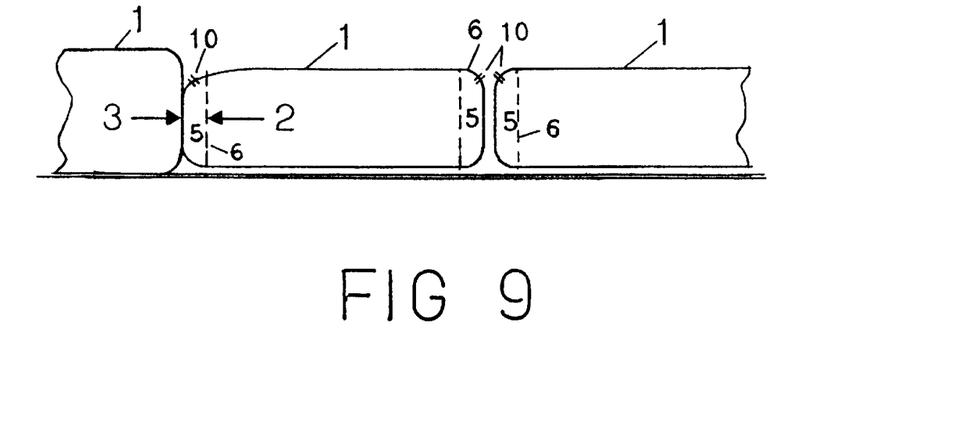
FIG. 9 is a train disposed with the cell structures of the object protection system.

FIGS. 7, 8 and 9 show another preferred embodiment of the present invention which comprises an object 1 of a vehicle subjected to a collision with other objects 1 in an accident, the striking force acting onto some of the cell structures 6 and mediums 5 therein, the force releasing means 10 in function when the cell structure and medium subjected to a certain amount of force. This object protection system is to protect the vehicle and passengers in case of accident.

Figure 10:
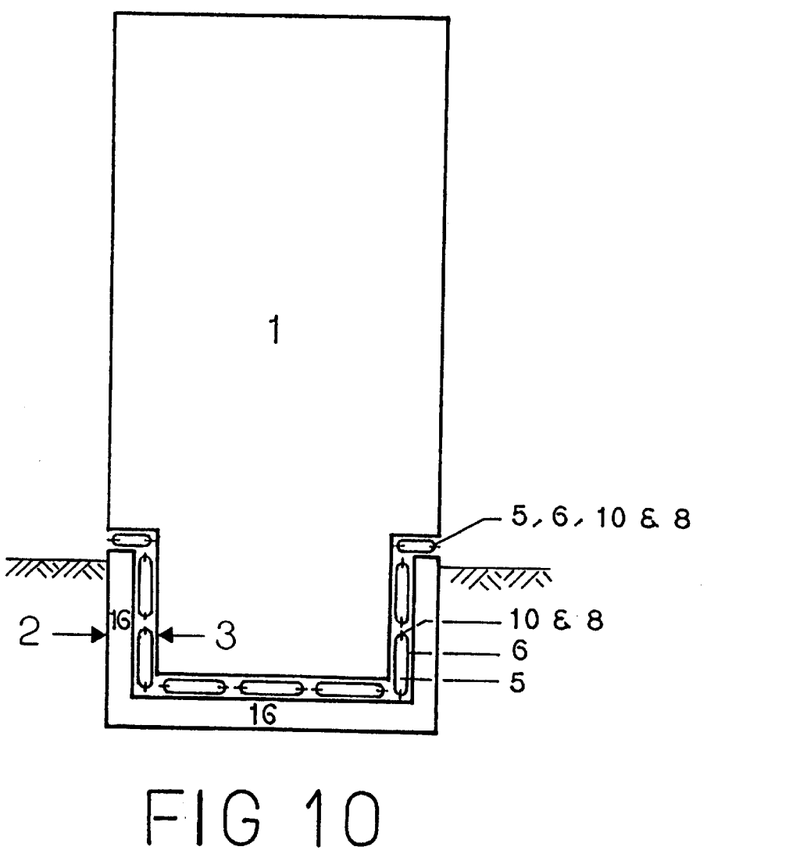
FIG. 10 is a sectional elevation of a building supported and surrounded by the object protection system.
Figure 11:
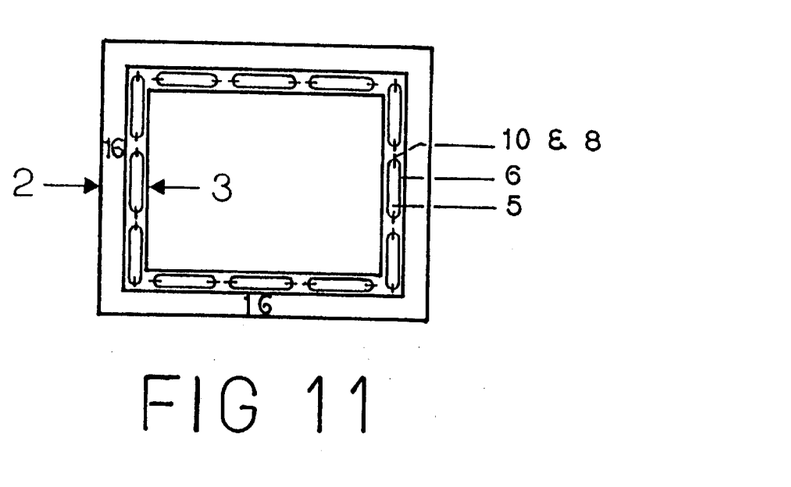
FIG. 11 is the plan view of FIG. 10.

FIGS. 10 and 11 show another embodiment of the present invention. It comprises an object 1 of a building structure subjected to an earthquake force 2 acting onto the foundation and the frame 16, through the cell structures 6 and the mediums 5, the force releasing means 10 in function when the cell structures 6 and mediums 5 are subjected to a certain amount of force, and the medium refilling means 8 in function after the energy force releases and or a series of cell structures is consecutively in function to release the energy force from the forcing system into a space. These functions are continuously taking place to protect the building structure during the occurrence of an earthquake.

Figure 12:
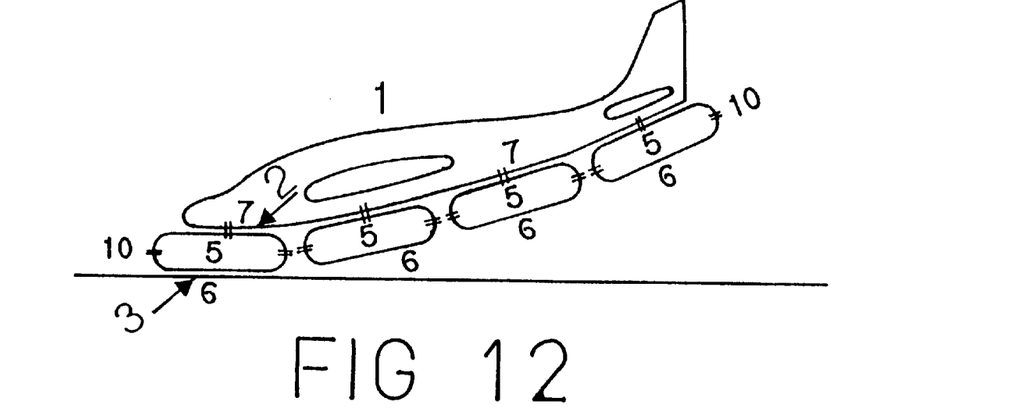
FIGS. 12 and 13 are the side elevation and front elevation of an airplane, respectively with a means of inflating medium into the cell structures for the protection of emergency landing of an airplane.
Figure 13:
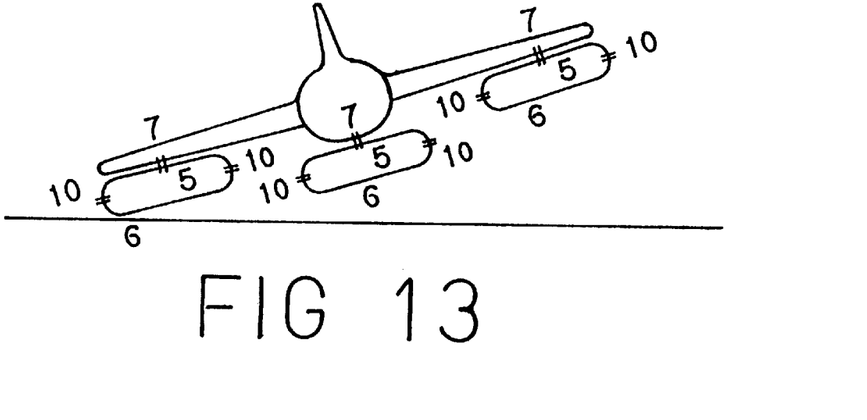

FIGS. 12 and 13 showing an airplane in case of emergency landing comprise cell structures 6, mediums 5, medium inflating means 7 and force releasing means 10. All cell structures are to be inflated when they are in use, otherwise all cell structures are not inflated and stored in the body of the airplane.

Figure 16:
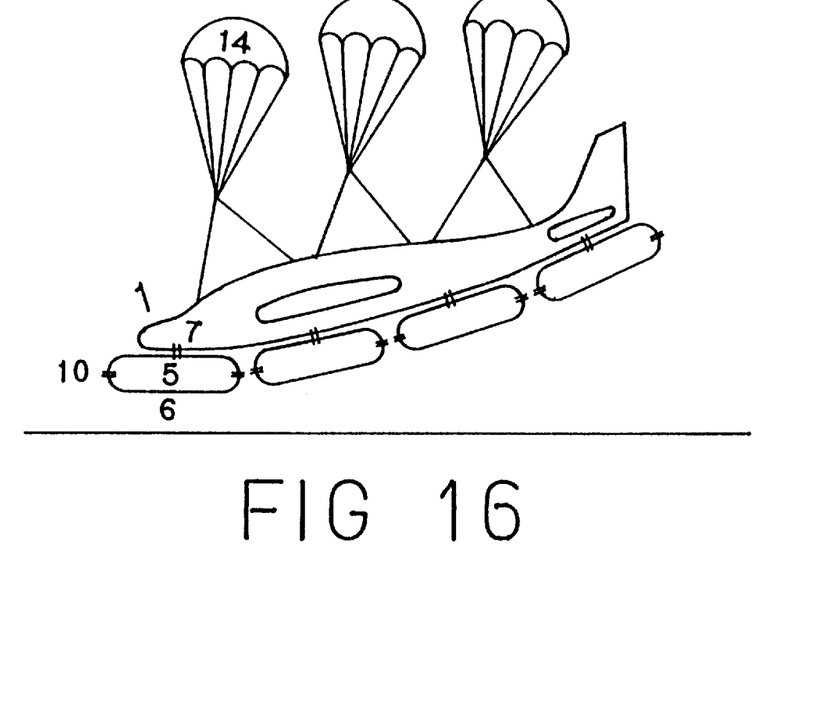
FIGS. 16 and 17, in addition to FIG. 12 and 13, comprise a means of parachute action to decelerate and balance a moving object.
Figure 17:
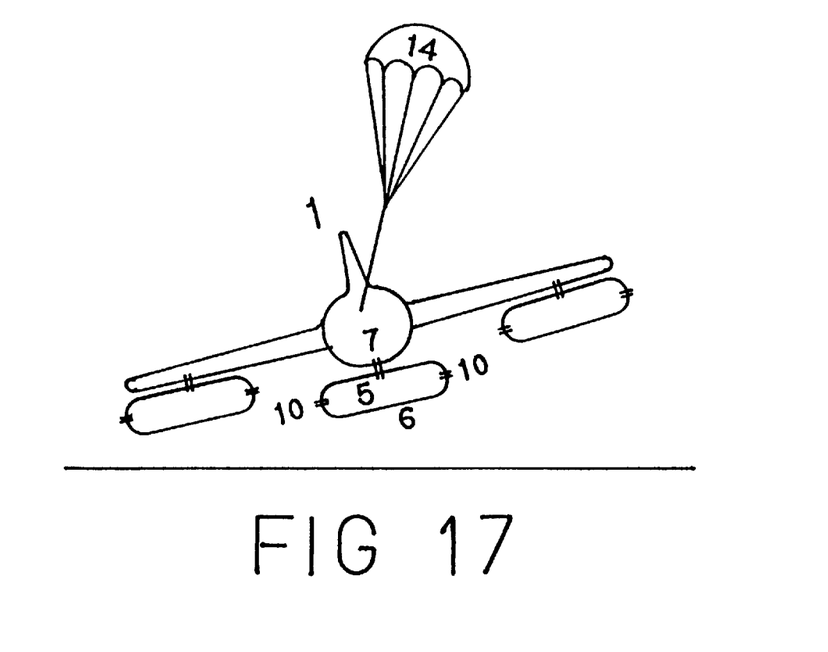

FIGS. 16 and 17, in addition to FIG. 12, comprise a decelerating and balancing means 14 which is equipped for use in case of emergency landing and stored in the body of an airplane.

Figure 18:
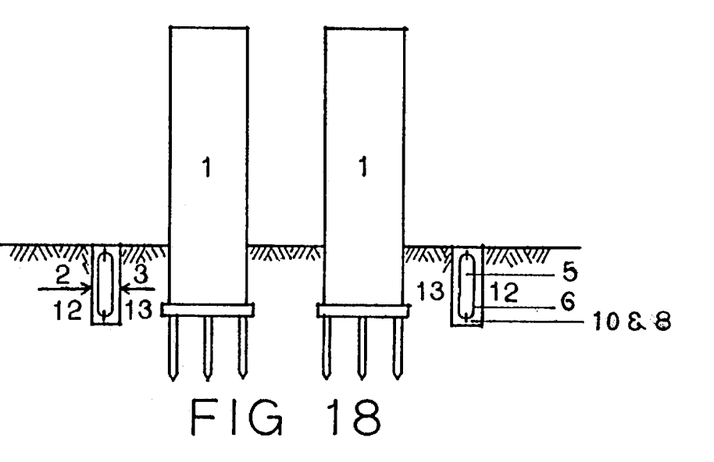
FIG. 18 is a sectional elevation of FIG. 19 and FIG. 20, disposed with a surrounded building ground method of the object protection system.
Figure 19:
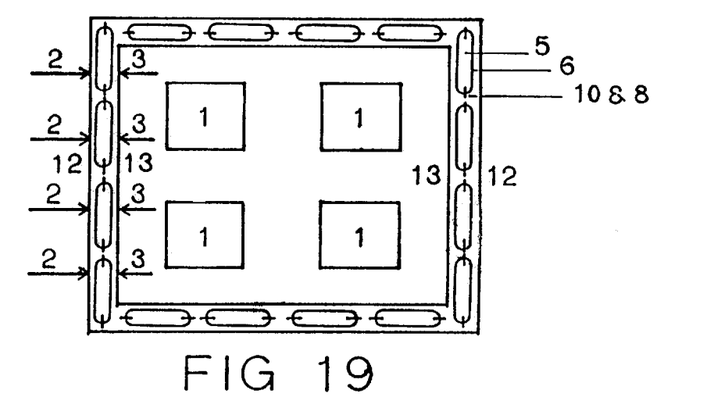
FIG. 19 is a plan view of building structures of a city street block surrounded on four sides by the building ground method of the object protection system.
Figure 20:
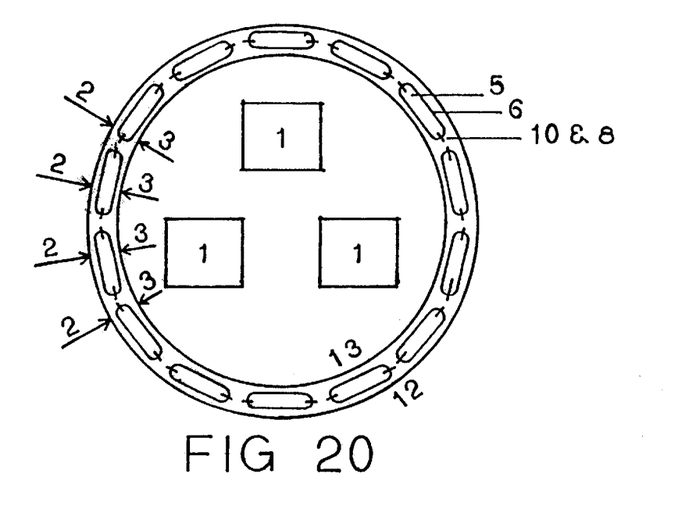
FIG. 20 is a plan view of a group of high-rise building structures in a particular site surrounded on a perimeter by the building ground method of the object protection system.
Figure 21:
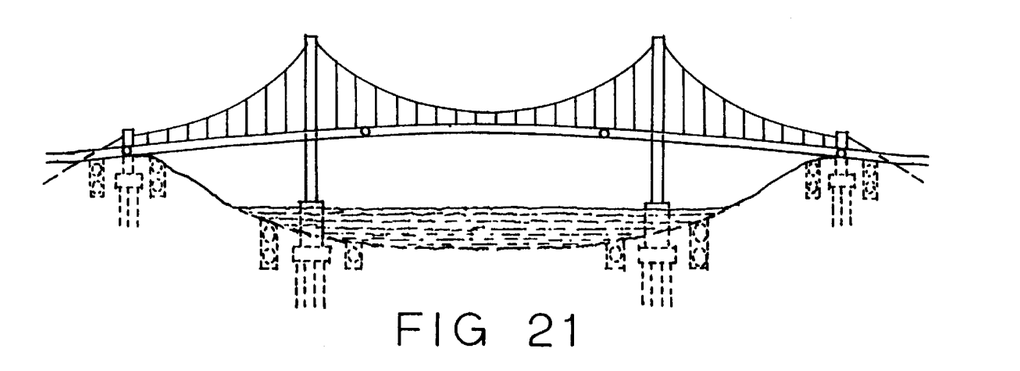
FIGS. 21 and 23 are the elevations of a suspension bridge and a pier supported bridge, respectively. The bridge foundations are protected by the river bed method of the object protection system.
Figure 22:
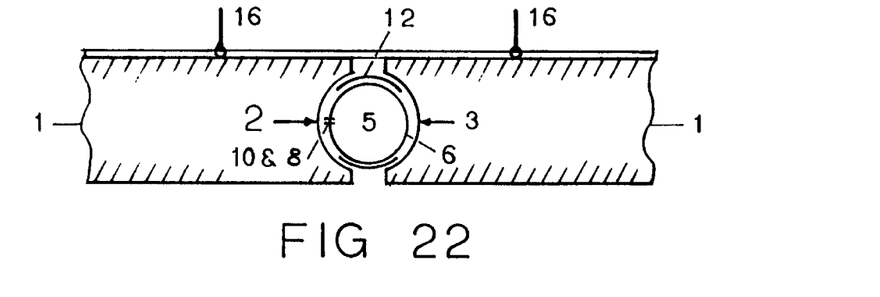
FIGS. 22 and 24 are the cell structures of the object protection system disposed between two ends of the bridge decks.
Figure 23:
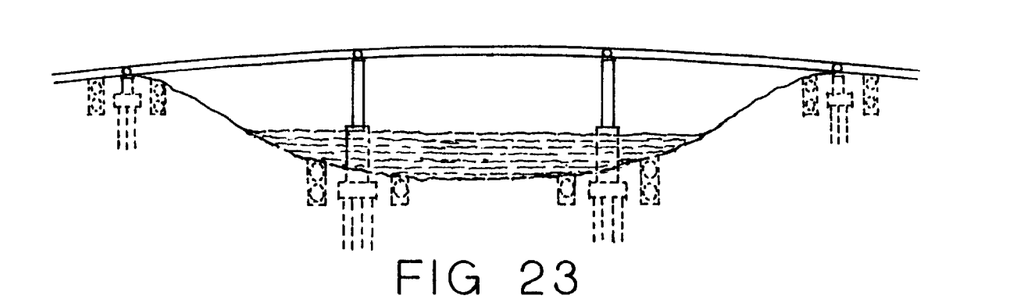
Figure 24:
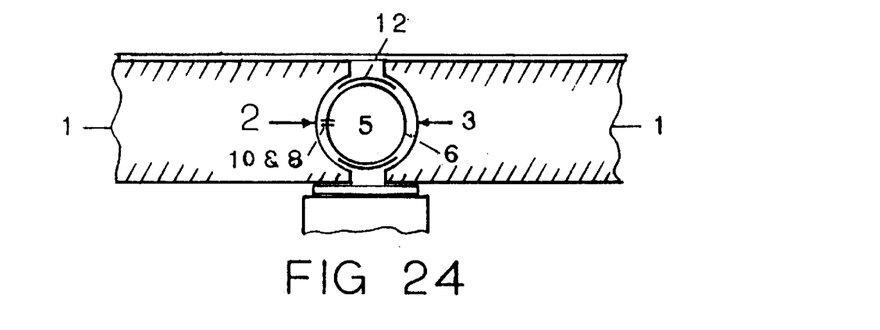

FIGS. 18, 19 and 20 show the building ground method of the object protection system. It comprises object 1 of building structures, earthquake striking force 2 acting on a moveable panel 12, through cell structures 6 into medium 5, and on a fixed panel 13, means for force releasing 10 releases force from a forcing system into a space whereby the reacting force 3 is less then the striking force 2 by the principle of energy force releasing into a space. The medium 5 can be refilled after it has been released from the cell structures 6 by means for medium refilling 8 and or a series of cell structures consecutively in function to release the energy force from the forcing system into a space. According to the nature of earthquakes, the earthquake force and movement constitute in the horizontal direction, thereby the building ground method applies in the horizontal direction to enclose a particular site or street block. This method greatly facilitates the existing building structures without seismic design and the proposed building structures to achieve the protection from the occurrence of an earthquake.

FIGS. 21, 22, 23 and 24 show another embodiment which applies the same principle of the object protection system.

This embodiment comprises object 1 of bridge decks, earthquake striking force 2 acting on one side of a bridge deck 1, through cell structures 6 into medium 5, and onto another side of a bridge deck 1, two moving panels 12 enclosing the cell structure 6. Means of force releasing 10 releases energy force from a forcing system into a space whereby the reacting force 3 is less then the striking force 2 by the principle of force release into a space. The medium 5 can be refilled after it has been released from the cell structures 6 by means of medium refilling 8. This special bridge deck application of the present invention greatly reduces the inducing force during an earthquake between two bridge decks. The river bed application to the bridge foundation is similar to the building ground application. The bridge decks and foundations are protected by this object protection system.

Figure 25:
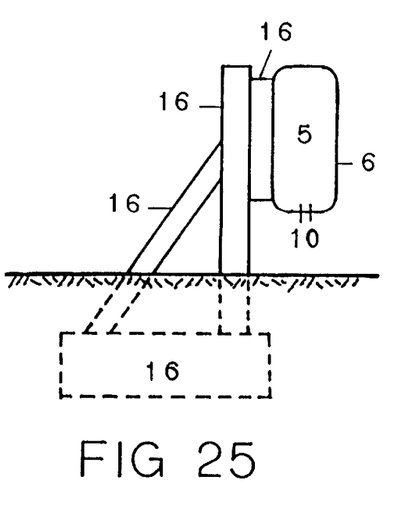
FIGS. 25 and 26 are the sectional elevations of the highway barriers disposed with the cell structures of the object protection system.
Figure 26:
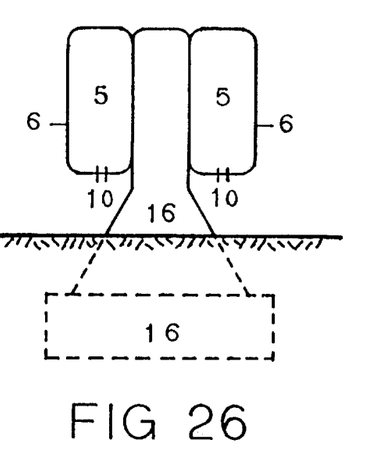

FIGS. 25 and 26 show another preferred embodiment consisting of cell structures 6, medium 5, means for force releasing 10, and frame and foundation 16. This embodiment can be disposed onto highway barriers to reduce the reacting force 3 responding to the forcing system in the direction opposite to striking force 2 in case of an accident to protect properties and lives.

Figure 27:
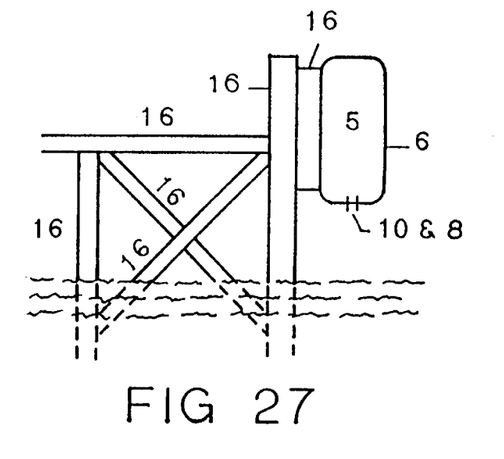
FIGS. 27 and 28 are the sectional elevations of the pier and river bank, respectively, disposed with the cell structures of the object protection system.
Figure 28:
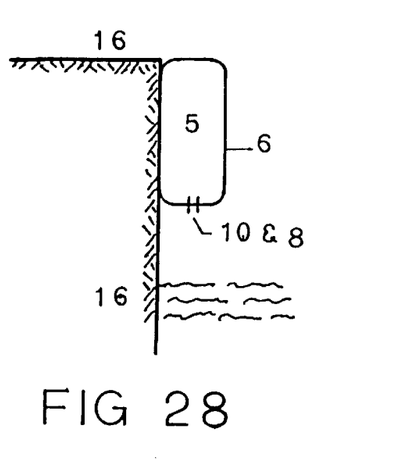
Figure 29:
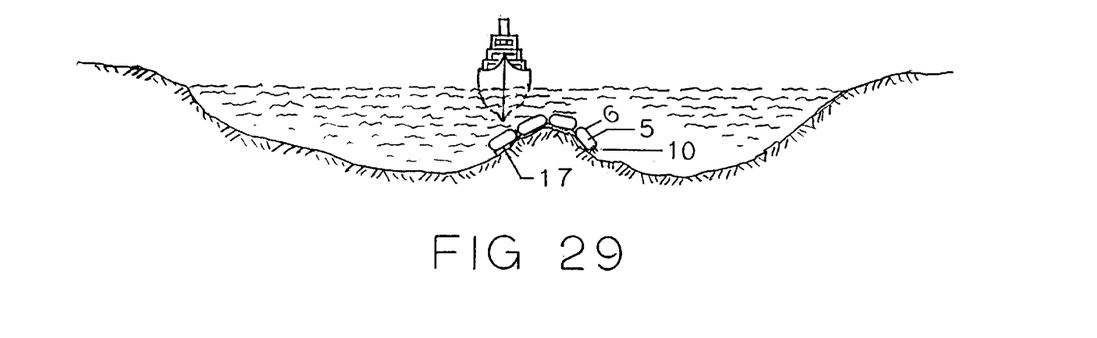
FIG. 29 is a cross section of a river disposed with the river bed method of the object protection system.

FIGS. 27 and 28 show another preferred embodiment consisting of cell structures 6, medium 5, means for force releasing 10, means for medium refilling 8, and frame and foundation 16. It can be disposed onto piers and river banks to reduce the reacting force 3 responding to the forcing system in the direction opposite to striking force 2 in case of bumping from a ship. FIG. 29 is the application of the river bed method to protect the ships or the other water vehicles in case of sailing on the shallow river bed.

DESCRIPTION OF TERMS AND ELEMENTS

Theory: The reacting force responding to the forcing system in the direction opposite to the striking force is less than the striking force by the principle of the energy force releasing from the forcing system into a space.

Object: The objects include, but not be limited to, land, air and water vehicles, passengers, highways, bridges, piers, building structures, occupants, vibrating machines, sensitive equipment and instruments, and dangerous goods such as dynamite, nuclear fuel and chemical substances.

Striking force: Striking force is a force acting on an object.

Energy force: Energy force is a force created by a striking force in a medium of a forcing system. It is confined by a cell structure.

Reacting force: Reacting force is a force responding to a forcing system in the direction opposite to a striking force.

Medium: Mediums included, but are not limited to air, gas, and fluid materials.

Medium cell structure: Medium cell structure is made of suitable elastic and rigid materials.

Medium cell structure inflating means: A means inflates the cell structure with suitable medium.

Energy body: Substances contain in a forcing system.

Medium refilling means: A means refills medium into the medium cell structure.

Force releasing means: A means releases energy force from a forcing system into a space.

Force measuring means: A means measures the amount of reacting force in the direction opposite to the striking force in a particular forcing system.

Space: Space is an unlimited open space or and a confined space.

Function: The medium is functioning to create and release the energy force due to a striking force in a particular forcing system. The release of energy force will not react upon the object by the principle of force releasing into a space.

Panel: Panels are moveable and fixed relative to an object.

Decelerating and balancing means: A means decelerates and balances the object while it is in motion.

Building ground method: This method disposes the object protection system surrounding the foundation of the building structures to release the major seismic force in the horizontal direction.

River bed method: This method is similar to the building ground method. It is applied in the river bed.

The system of the invention is so designed, preceding the occurrence of vibration or earthquakes, that the cell structures, elastic mediums, objects and the supporting structures are stable, and are able to withstand dead loads, live loads, superimposed loads and wind loads, in compliance with the codes and regulations as required by the relevant jurisdictions.

I claim:

1. An object protection system comprising; a frame having at least a pair of spaced parallel slides mounted thereon, at least a first and second movable panels slidably mounted on said slides, at least one cell structure made of an elastic material and containing a medium or air, gas, or fluid, said cell structure comprising at least one medium refilling means and at least one energy releasing means disposed in said cell structure, said at least one cell structure located between said first and second movable panels, at least a pair of springs attached to said second movable panel and disposed on the frame on a side of the second panel opposite to a side of said second panel which contacts the cell structure, and a reacting force recording pin attached to said second panel on said opposite side for recording the amount of a reacting force, whereby, when a striking force strikes said first movable panel said striking force acts on said cell structure creating an energy force, a reacting force responding to and in a direction opposite to the striking force is significantly less than fifty percent of the striking force due to the release of said energy force through said energy release means and thereby protecting an object.

* * * * *